Oct. 13, 1970　　　M. J. DRAPER　　　3,533,230
HYDRAULIC TRANSMISSION MECHANISM FOR VEHICLES
Filed Oct. 21, 1968
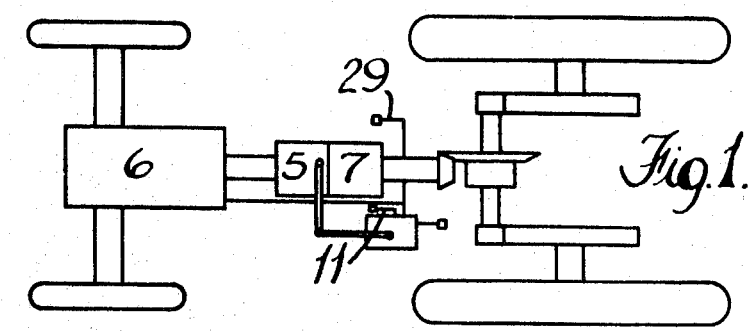
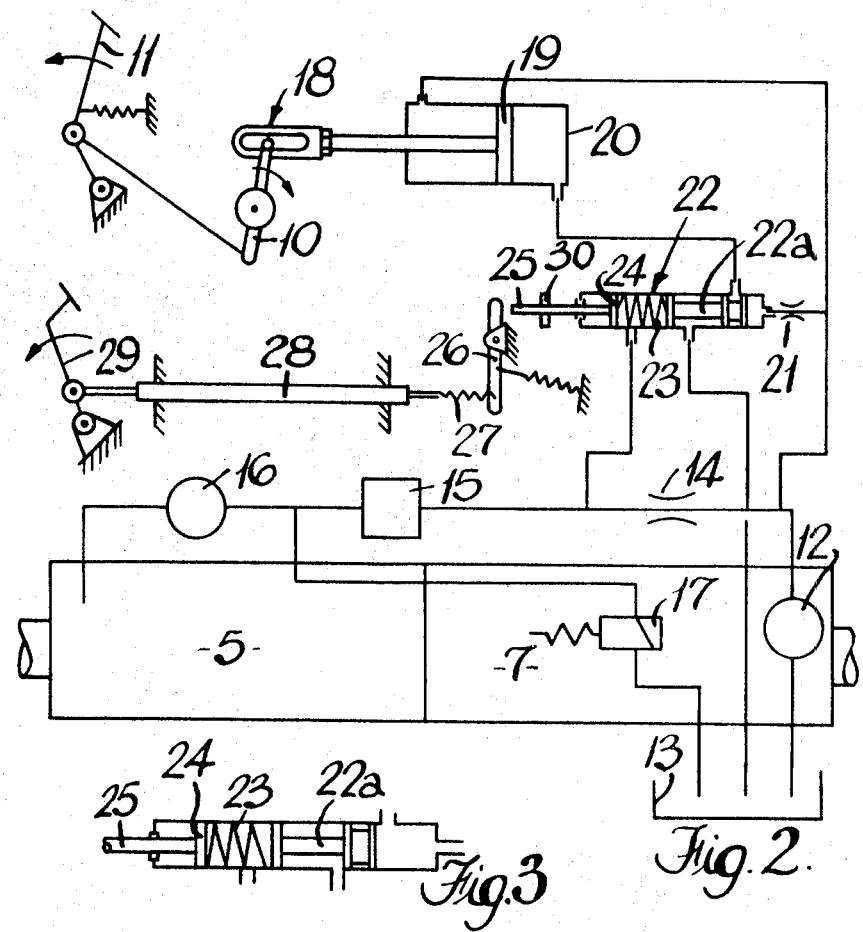
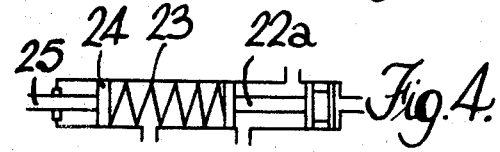
INVENTOR
Michael John Draper
BY Glascock Downing
   & Seebold
ATTORNEYS United States Patent Office 3,533,230
Patented Oct. 13, 1970

3,533,230
HYDRAULIC TRANSMISSION MECHANISM
FOR VEHICLES
Michael John Draper, Swaffham, England, assignor to
Joseph Lucas (Industries) Limited, Birmingham, England
Filed Oct. 21, 1968, Ser. No. 769,117
Int. Cl. F02b 41/00
U.S. Cl. 60—19                                    4 Claims

ABSTRACT OF THE DISCLOSURE

A hydraulic transmission mechanism for vehicles of the type having a fluid operable motor, a main engine driven pump for supplying motive power to the motor, a driver operable speed ratio control for varying the stroke of the pump and/or motor to change the speed ratio between the vehicle engine and the motor, and a secondary engine driven pump for making up any fluid losses in the hydraulic circuit, in which a cylinder containing a piston is connected through a lost motion device to the speed ratio control, with one end of the cylinder being connected directly to the secondary engine driven pump, and the other end to the secondary engine driven pump through a valve, the position of which is responsive to the pressure drop across a restriction in the fluid line through which the secondary engine driven pump is arranged to deliver fluid, the arrangement being such that when said pressure drop falls below a predetermined value the valve will move automatically to a position to exhaust said other end of the cylinder and thereby cause the piston to move to reduce the speed of the motor in relation to the speed of the engine.

BACKGROUND OF THE INVENTION

This invention relates to hydraulic transmission mechanism for vehicles, and more particularly although not exclusively for earth-moving and like vehicles, with the mechanism being of the kind comprising in combination a fluid operable motor, a main engine driven pump for supplying motive power to the motor, a driver operable speed-ratio control for varying the stroke of the pump and/or motor to change the speed ratio between the engine and motor, and a secondary engine driven pump for making up any fluid losses in the hydraulic circuit.

When an earth-moving, or like vehicle fitted with such a mechanism encounters an increased load suddenly, as, for example, when it first strikes a pile of earth, or a boulder, there is a substantial risk of the engine being stalled unless the driver reacts quickly to change the speed ratio between the engine and motor, and the object of the present invention is to incorporate in a mechanism of the kind specified convenient means for minimizing this risk.

SUMMARY OF THE INVENTION

According to the invention a hydraulic transmission mechanism of the kind specified is characterized by the provision of a cylinder containing a piston connected through a lost-motion device to the speed ratio control, one end of the cylinder being connected directly to the secondary engine driven pump, and the other end of the cylinder being connected to the secondary engine driven pump through a valve the position of which is responsive to the pressure drop across a restriction in the fluid line through which said secondary pump is arranged to deliver fluid, the arrangement being such that when said pressure drop falls below a predetermined value the valve will move automatically to a position to exhaust said other end of the cylinder and thereby cause the piston to move to reduce the speed of the motor in relation to the speed of the engine.

The invention may further reside in the provision of means operable by the vehicle engine speed control (e.g., throttle pedal) for varying the predetermined value of the pressure drop at which said valve moves.

An example of the invention will now be described with reference to the accompanying drawings in which:

BRIEF DESCRIPTION OF THE DRAWINGS

FIG. 1 is a diagrammatic plan view of a tractor vehicle fitted with the mechanism, FIG. 2 is a diagram of sufficient of the novel parts of the mechanism for an understanding of the invention, and FIGS. 3 and 4 respectively are enlarged views of the valve seen in FIG. 2 in its two alternative positions.

DETAILED DESCRIPTION OF THE INVENTION

The main portions of the hydraulic transmission mechanism may follow known practice and comprise a swash plate type pump 5 arranged to be driven by engine 6 of the vehicle and adapted to supply motive fluid through a closed circuit to a fluid operable motor 7 of the swash plate type for imparting movement to the vehicle. The obliquity of the swash plate of the pump 5 and/or motor 7 can be varied by angular movement of an arm 10 to change the speed ratio of the motor 7 relative to the engine 6, with the position of the arm 10 normally being controlled by a driver operable pedal 11 which is spring loaded to a position to give maximum speed of the motor for a given engine speed.

There is also provided a secondary engine driven pump 12 for drawing fluid from a reservoir 13 and passing it through a restriction 14, cooler 15, and filter 16 to make up any losses in the closed pump and motor circuit, and excess fluid is returned to the reservoir 13 through a spring loaded relief valve 17.

Connected by a pin and slot connector 18, or other lost motion device to the arm 10, is the rod of a piston 19 contained in a cylinder 20. One end of the cylinder 20 is connected directly to the output of the pump 12. The other end of the cylinder 20 can be connected to the output of the pump 12 through a restrictor 21 and spool valve generally designated 22.

A spool 22a of the valve 22 is loaded towards the position shown in FIG. 4 by means of a spring 23 acting between the spool and an abutment 24. In this position the other end of the cylinder 20 can exhaust to the reservoir 13.

The abutment 24 is connected to a rod 25 which extends from the valve casing in a position to be contacted by one end of a lever 26 pivoted on a relatively fixed part of the vehicle. The other end of the lever 26 is connected through a spring 27 and rod 28 to an accelerator pedal 29 or other engine speed controlling device operable by the driver. The arrangement is such that as the driver moves the control device 29 to increase the engine speed the abutment 24 will be moved to increase the force of the spring 23, up to a limit determined by a stop 30.

When the vehicle engine is operating the pump 12 has an output which is dependent upon engine speed, and there is a pressure drop across the restriction 14 which increases as the engine speed increases. The different pressures at opposite sides of the restriction 14 are applied to opposite ends of the spool of 22a the valve 22. When the engine speed is high in relation to the setting of the driver control device 29 the valve assumes the position shown in FIG. 3, wherein the pump output is connected to both ends of the cylinder 20. As a result the piston 19 assumes a position in which the arm 10 can move to a position in which the motor speed is at maximum for a given engine speed, although the speed ratio can be changed by operation of the pedal 11 by the driver due to the lost motion device 18.

If the load on the engine increases suddenly to such proportions that the engine is slowed, the flow through the restriction 14 falls, with a resulting fall in the pressure drop. As a result the valve 22 moves to the position shown in FIG. 4 and the piston 19 is moved quickly in a direction to reduce the speed of the motor in relation to the engine.

It will be understood that since the position of the pedal 29 varies the force of the spring 23, it serves also to determine the pressure drop across the restriction 14 at which the valve 22 will change over. Moreover, the arrangement is such that before the stop 30 arrests movement of the rod 25, the valve 24 will operate at a substantially constant drop in engine speed. However, after the stop 30 has arrested movement of the rod 25 the valve will become operative at a predetermined engine speed irrespective of the throttle being opened wider.

Having thus described my invention what I claim as new and desire to secure by Letters Patent is:

1. A hydraulic transmission mechanism of the kind having a fluid operable motor, and a main engine driven pump for supplying motive power to the motor characterized by the provision of a cylinder containing a piston connected through a lost-motion device to a speed ratio control, one end of the cylinder being connected directly to a secondary engine driven pump and the other end of the cylinder being connected to the secondary engine driven pump through a valve the position of which is responsive to the presure drop across a restriction in a fluid line through which said secondary pump is arranged to deliver fluid, the arrangement being such that when said pressure drop falls below a predetermined value, the valve will move automatically to a position to exhaust said other end of the cylinder and thereby cause the piston to move to reduce the speed of the motor in relation to the speed of the engine.

2. The hydraulic transmission mechanism as claimed in claim 1 including means for varying the pressure drop at which the valve will move automatically in dependence upon the setting of a driver operable engine speed controlling device.

3. The hydraulic transmission mechanism as claimed in claim 2 wherein the valve is spring loaded and the means for varying the pressure drop at which the valve will move varies the loading of the spring in dependence upon the setting of the driver operable engine speed controlling device.

4. The hydraulic transmission mechanism as claimed in claim 3 including a stop whereby the spring cannot be further loaded after the engine speed controlling device has been moved to a predetermined extent.

References Cited
UNITED STATES PATENTS

| | | | |
|---|---|---|---|
| 3,054,263 | 9/1962 | Budzich et al. | 60—53 |
| 3,168,295 | 2/1965 | Dorrell et al. | 60—19 XR |
| 3,246,471 | 4/1966 | Goodale | 60—19 XR |

EDGAR W. GEOGHEGAN, Primary Examiner